July 7, 1936. H. J. BRANDENBURGER 2,047,122
PROGRAM CYCLE TIMER
Filed Feb. 14, 1931 5 Sheets-Sheet 1

INVENTOR:
Herbert J. Brandenburger,
BY Bodell & Thompson
ATTORNEYS.

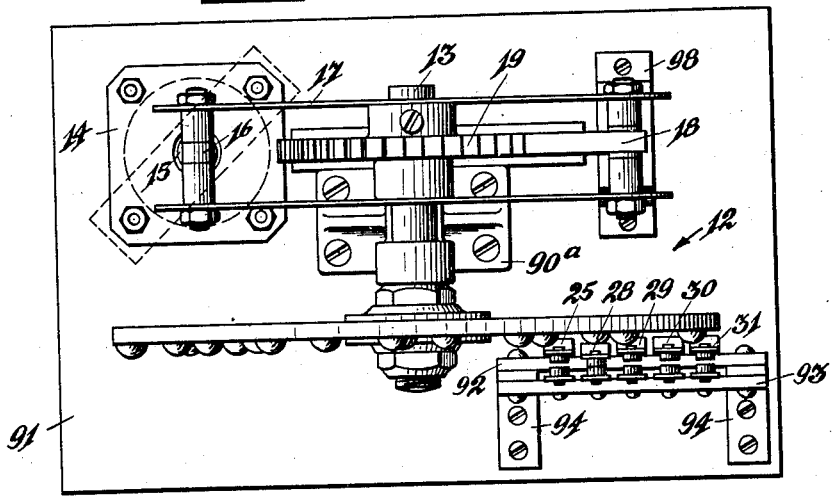
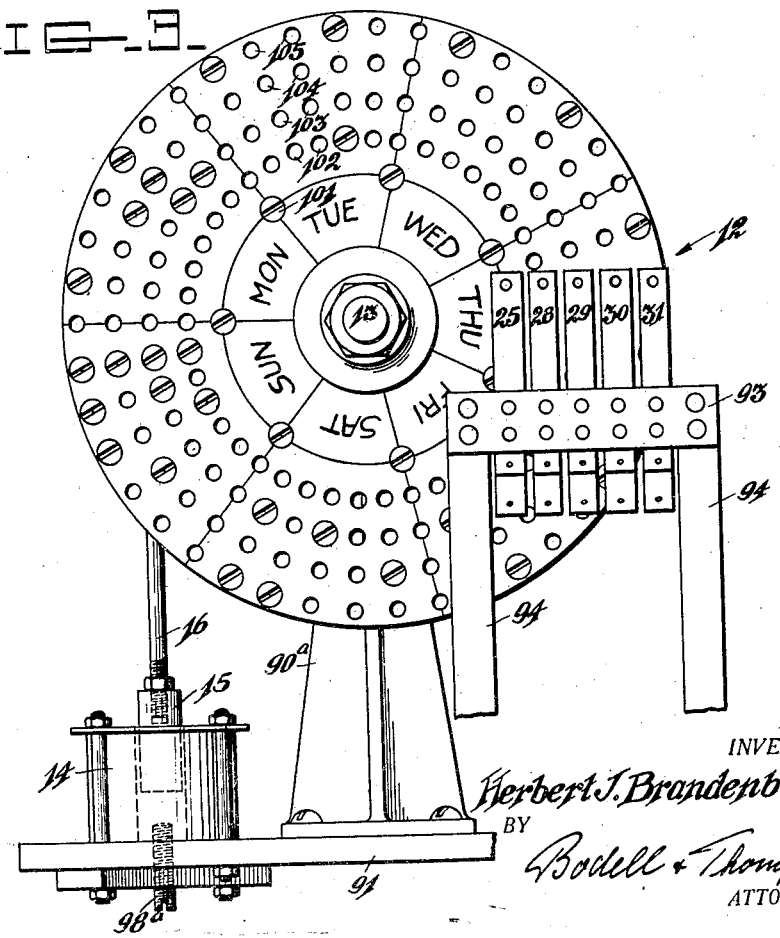

July 7, 1936.  H. J. BRANDENBURGER  2,047,122
PROGRAM CYCLE TIMER
Filed Feb. 14, 1931  5 Sheets-Sheet 3
FIG_4_
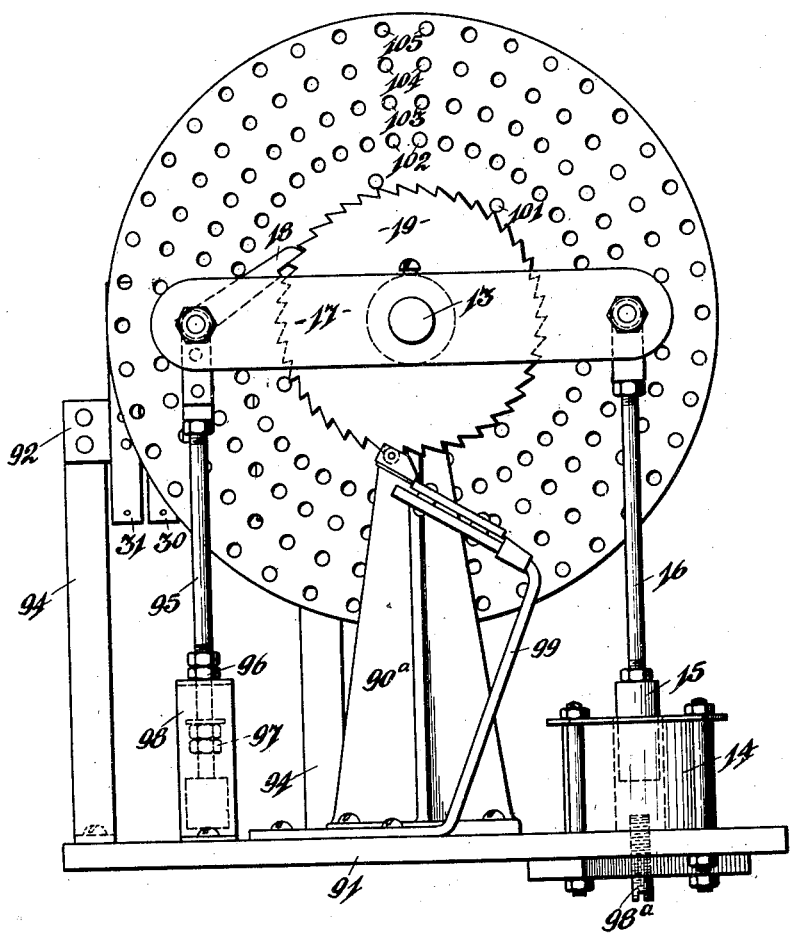
INVENTOR:
Herbert J. Brandenburger,
BY Bodell & Thompson
ATTORNEYS.

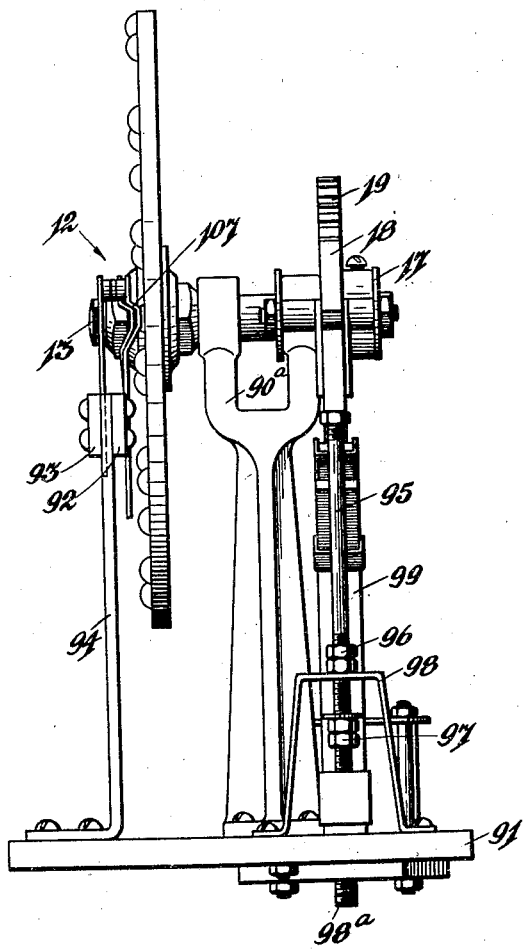

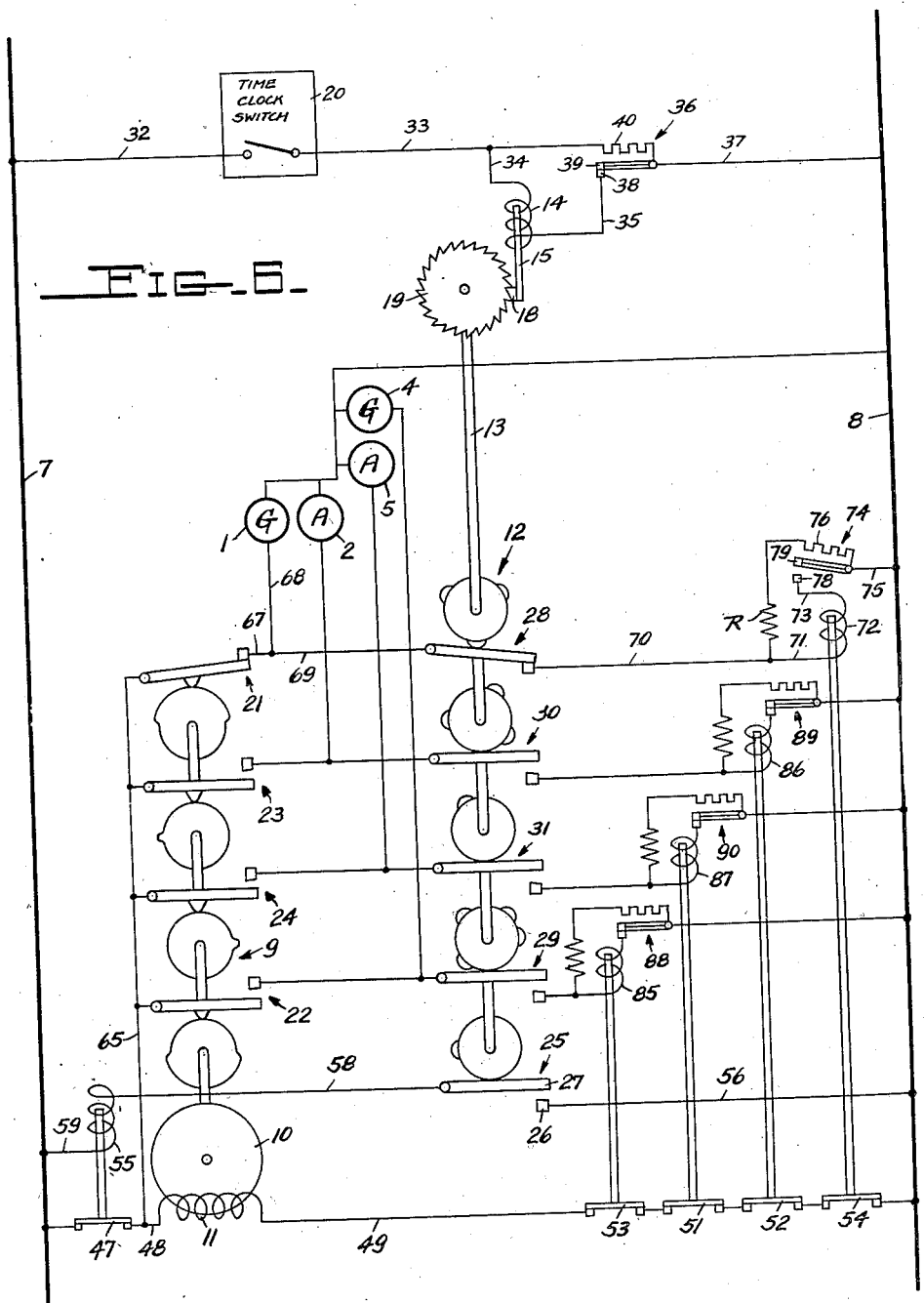

Patented July 7, 1936

2,047,122

UNITED STATES PATENT OFFICE 2,047,122

PROGRAM CYCLE TIMER

Herbert J. Brandenburger, St. Louis, Mo., assignor to Crouse-Hinds Company, Syracuse, N. Y., a corporation of New York Application February 14, 1931, Serial No. 515,721

6 Claims. (Cl. 177—337)

This invention relates to cycle timers and has for its object a simple inexpensive means for varying subdivisions of the cycle in accordance with a prearranged plan or program and a particularly simple, economical and efficient means for automatically varying or extending certain sub-divisions of the cycle. More particularly, it has for its object means for prolonging the display of certain signals in a traffic signaling system at predetermined times during the day and also effecting the prolongations of certain signals at predetermined different times during different days of the week, in order to suit the traffic conditions prevalent during different days and different periods of the several days.

The invention consists in the novel features and in the combinations and constructions hereinafter set forth and claimed.

In describing this invention, reference is had to the accompanying drawings in which like characters designate corresponding parts in all the views.

Figure 2 is a plan view of the timer which controls the program of the signal display for the several days of the week.

Figure 3 is an elevation of parts seen in Figure 2.

Figure 4 is an opposite side elevation of that seen in Figure 3.

Figure 5 is an edge view of parts seen in Figure 3 looking to the left.

Figure 6 is an across-the-line diagram illustrating the operation of this system.

Figure 1:
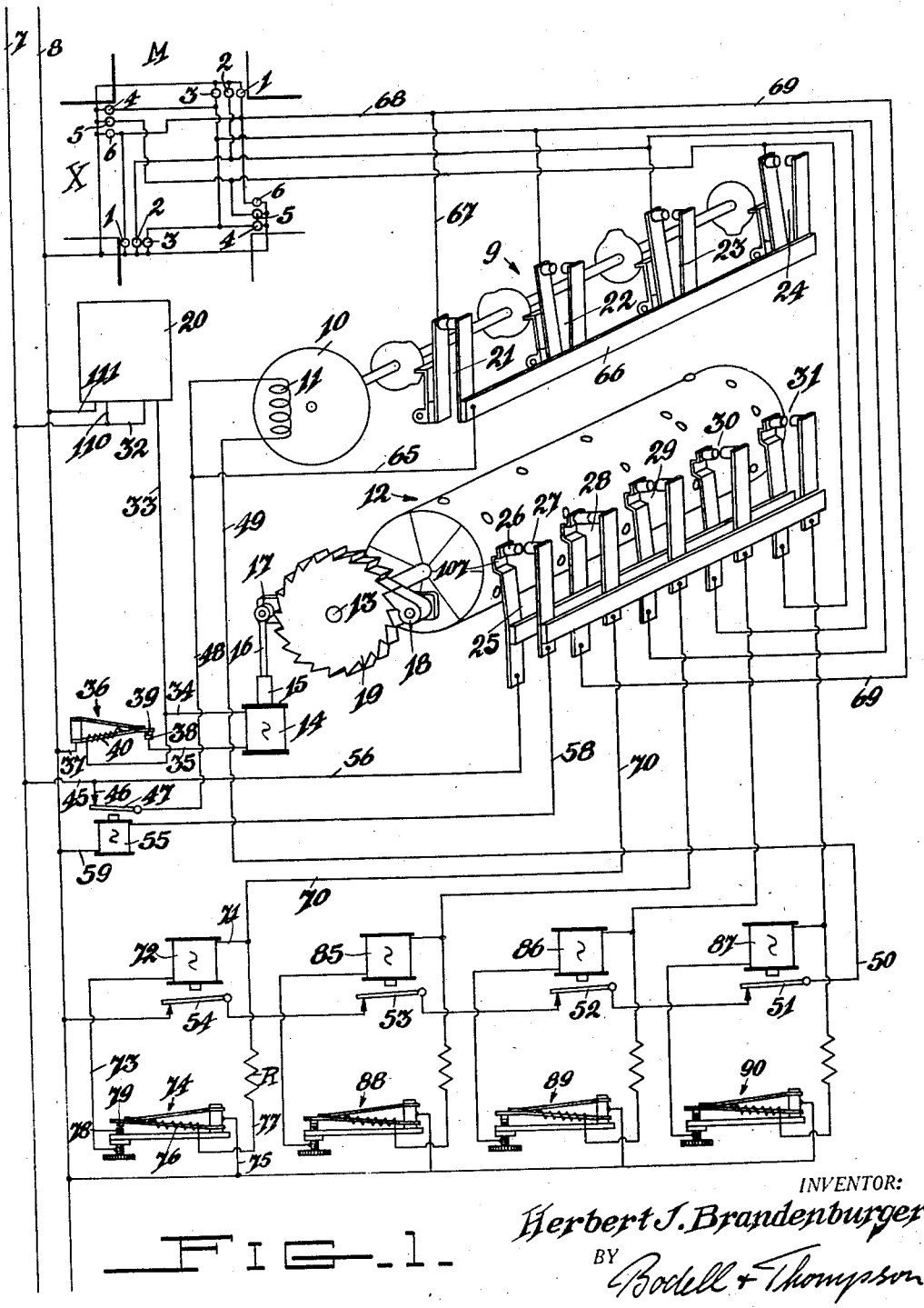
Figure 1 is a diagrammatic view of this invention.

I have here shown my invention as applied to traffic signaling systems in which all of the signals passing through repeated traffic cycles may be controlled. At certain periods of the day, as for instance from seven to nine o'clock in the morning; twelve to one o'clock and five to seven o'clock in the evening, it may be desirable, in order to keep the traffic moving as smoothly as possible to change the relative time allotted to the various traffic periods by the timer. Also, on different days of the week, it may be desirable to vary the relative time allotted to the various traffic periods by the timer in terms of the predetermined traffic requirements of each particular day. Thus, the different days of the week may require different programs in order to maintain a smooth moving of the traffic. Also, at certain periods, when there is very little traffic, it may be desirable to discontinue the traffic signals, as for instance from twelve o'clock midnight to six o'clock the following morning. In my copending application Sr. No. 515,722, filed on even date with this application, I have claimed a device wherein a timer operable through a cycle having a plurality of periods, may during certain parts of the day, have one of the periods of the cycle prolonged.

This invention comprises means for prolonging certain predetermined signals at predetermined times of the day and automatically changing the variations during the different days of the week in accordance with a predetermined program. The word "prolonging" is relative only and a signal may be prolonged relative to the other signals by shortening the latter, but in the illustrated embodiment of my invention, the time extent of the signals prolonged is actually extended beyond their normal time.

I have here illustrated my invention as applied to street traffic signaling systems having electrically operated signals, which are usually lamps with different colored lenses with green for go, red for stop and amber for intermediate warning signal, if an intermediate signal is used.

M designates the main street and X the cross street. 1, 2 and 3 designate respectively the green, amber and red signals displayed in opposite directions on the main street M. 4, 5 and 6 designate the green, amber and red signals displayed respectively in opposite directions on the cross street X, these being connected in branch electric circuits fed from service wires 7 and 8. The signals normally pass through repeated traffic cycles and their display is controlled by a timer 9, which controls the opening and closing of the signal lamp circuits. The timer may be of any suitable form, size and construction. It is usually of the rotary cam type with contacts or switch means in the branch circuits, as signal circuits. The timer 9 is usually actuated by an electric motor 10, which may also be of any suitable construction, it being preferably an induction disk motor, the rotor of which is mounted on or connected to the cam shaft of the timer 9. The driving coils 11 are in a motor circuit connected to the service wires 7 and 8 as will be hereinafter described.

The means for controlling the prolongation of certain signals comprises a second timer 12 and a timed switch operated independently of the timers 9 and 12 for controlling the flow of current through switch means controlled by the second timer, the second timer being here illustrated as intermittently actuated by electro-magnetic means connected in a circuit controlled by the timed switch. The timed switch is usually clock operated. The timer 12 is shown diagrammatically in Figure 1, and one practical construction is shown in Figures 2, 3, 4 and 5. The timer 12 includes a shaft 13, which is actuated by an electro-responsive means as a solenoid 14 having its core 15 connected by a link 16 to an oscillating arm 17 carrying a pawl 18, which coacts with a ratchet wheel 19 mounted on the timer shaft 13.

20 designates the clock operated switch, which also may be of any suitable construction, it closing an electric circuit through the windings of the solenoid 14 at predetermined intervals. Adjustable clock timed switches are standard articles of manufacture, it being here shown as of the spring actuated type, automatically wound through a circuit consisting of the wires 110 and 111. The time clock switch 20 may be of the type described in Sales Circular 133 of the Sangamo Electric Company, Springfield, Illinois. The construction of this adjustable clock timed switch however, forms no part of this invention. The timer 9 has switch means as pairs of contacts 21, 22, 23, 24 for controlling, respectively, the flow of current to the green signals on the main street and the red signals on the cross street, the display of red signals on the main street and green signals on the cross street; the amber signals on the main street; and the amber signals on the cross street. Thus, in the normal operation, when the contacts of the switch means 21 are engaged, the green signals on the main street will be displayed, and the red signals on the cross street; likewise when the contacts 22 engage, the red signals on the main street and the green signals on the cross street will be displayed; likewise when the contacts 23 and the contacts 24 are engaged, the amber signals will be displayed on the respective streets, and the timing of the engagement of the various pairs of contacts is controlled by cams on the shaft of the timer 9.

In order to prolong certain predetermined signals, the motor 10 of the timer is, in this embodiment of my invention, stopped temporarily when the predetermined signals are displayed, for instance to prolong the green period on the main street and hence the corresponding red period on the cross street, the motor 10 will be stopped when the contacts of the switch means 21 are engaged; likewise if in certain instances it should be desired to prolong the green on the cross street, the motor will be stopped while the contacts 22 are engaged. If it is desired to prolong either or both of the amber periods, the motor is stopped while the pairs of contacts 23, 24 are engaged.

The timer 12 has switch means 25 consisting of a pair of contacts 26, 27 for shutting down the signal system temporarily, say from twelve o'clock midnight to six o'clock A. M., and additional switch means 28, 29, 30 and 31 corresponding to the switch means 21, 22, 23 and 24 of the timer 9, for prolonging one or more predetermined signals or all of the signals at predetermined times.

The clock operated switch 20 has a suitable time operated switch therein, which closes the circuit through the motor for the timer 12 at predetermined times.

The wiring is as follows:

32 designates a wire leading from the feed wire 7 to the timed switch 20. 33 is a conductor leading from the switch 20 and connected through a wire 34 to the windings of the motor for the timer 12, this being the solenoid 14. 35 is a conductor leading from the windings of the solenoid and connected through a normally closed timed switch 36 and wire 37 to the feed wire 8. Obviously, when the timed switch 20 closes, the circuit will be closed through the windings of the solenoid 14 causing the core 15 thereof to be pulled downwardly, and thus causing the ratchet wheel 19 and hence the timer 12 to be actuated one step or the extent of one tooth of the ratchet wheel 19. The timed switch 36 is a thermal electrical switch and normally holds two contacts 38 and 39 engaged, so that the circuit is closed between the wire 35 and the return wire 37 through the switch. The conductor 33 is also connected to a heating coil 40 of the thermal electric switch so that when the clock timed switch 20 closes, the current passes through the heating coil 40, and after a period of time heats the coil 40 sufficiently to cause the heat therefrom to warp the thermal switch 36 and separate the contacts 38, 39 so that the circuit through the windings of the solenoid 14 is broken and its core 15 returns to its normal position, thereby carrying the pawl 18 to its starting position for the next operation, and as long as the timed switch 20 remains closed, the heating coils 40 will be heated and the contacts 38, 39 remain separated. When the timed switch 20 breaks the circuit, the thermal switch will cool off, permitting the contacts 38, 39 to re-engage and be in position for the next operation, when the timed switch 20 again makes contact.

The action of the thermal switch 36 in opening the circuit through the solenoid 14 prior to the opening of the line 32, 33 by the clock timed switch 20 is effective only with types of clock timed switches so designed that a circuit when established by the clock switch requires a lapse of appreciable time, as for instance a minute or more before it can be broken through the clock mechanism. In the use of a clock switch means having momentary switching characteristics the time element required by the heating coil 40 of the thermal switch 36 may be longer than that of the time switch 20 in which case it automatically becomes inoperative as far as opening the circuit through the solenoid 14 is concerned, and the clock switch means performs this action directly.

The circuit through the driving coils of the motor 10 includes a wire 45 leading from the feed wire 7, contact 46, normally closed switch 47, wire 48 to the driving coils 11, and thence through wire 49 to a conductor 50 leading back to the feed wire 8, it having a plurality of normally closed switches 51, 52, 53, 54 therein. The switch 47 as well as switches 51, 52, 53, 54 are electro-magnetically operated and are the armatures of different electro-magnets. When an electro-magnet is energized, the corresponding switch will be opened.

The switch 47 in the main line circuit is opened by an electro-magnet 55, the windings of which are connected in the feed circuit through the switch means 25 of the second timer 12.

The wire 45 leading from the feed wire 7 is connected to contact 26 of the switch means 25 and contact 27 is connected through wire 58 to the windings of the electro-magnet 55, which windings are connected to the feed wire 8 by a return wire 59. Normally the contacts 26, 27 of the switch means 25 are separated and hence no current passes through the windings of the electro-magnet 55, and therefore, the motor and lamp circuit is normally closed. When, however, the second timer 12 is actuated so that it closes the contacts 26, 27 of the switch means 25, then the current will pass through the wire 56, switch means 25, wire 58 and the electro-magnet 55 and thus break the circuit of the motor 10 or the driving coils 11 thereof and also the signal circuits, so that the timer 9 is stopped and the signals are turned off, and will remain so as long as switch means 25 is closed, which may be over a period of several hours, as from twelve o'clock midnight to six o'clock in the morning. When the circuit through the switch means 25 of the timer 12 is broken, the switch 47 in the main line circuit returns to its normal or closed position, permitting the motor to start and the timer 9 to proceed through its regular cycles with the signals again in operation.

The various contacts of the second timer 12 to control the shutting down of the system and the prolongation of the signals are controlled by adjustable or movable cams properly placed on the body of the secondary timer 12, as will now be explained.

In the illustrated embodiment of my invention as shown in Figure 3, the body of the timer is a disk instead of the drum shown diagrammatically in Figure 1. This disk is divided up into seven major sections representing each day of the week. Six holes spaced concentrically are shown for each day of the week in each of the concentric rows of holes wherein cams may be placed to actuate switch means 28, 29, 30 and 31.

It is obvious, however, that any number of holes or cam spaces may be provided according to the traffic requirements, the same number being provided, however, for each day of the week. The total number of holes arranged concentrically in any one of the traffic period controls as for instance 28, 29, 30 or 31 correspond to the number of impulses imparted to the solenoid 14 in the course of one week by the clock timed switch 20. This in turn corresponds to the number of impulses necessary to advance the timer body or disk of the timer 12 through one complete revolution.

The number of separate impulses per day being the same for each day of the week, thus causes the disk to advance by steps through one-seventh of a complete revolution in each twenty-four hours.

The impulses necessary to advance or notch forward the body or disk of the timer 12 is caused to occur when for any reason, such as increase or decrease in traffic flow, it becomes advisable to change the relative time allotted to the various traffic periods of the signals operated by the timer 9.

In order that the position of the cams placed in the disk shall bear their intended relationship to the switch means they actuated, it is necessary that the clock timed switch 20 be adjusted to make and break the circuit through the solenoid 14 as often in each day as the design of the timer 12 requires for the movement of the cam body through one-seventh of a complete revolution in each twenty-four hours and thus one complete revolution in a week.

Cams may be placed in any or all positions or holes of the disk in accordance with a predetermined knowledge of the desirability of prolonging the traffic period effected thereby beyond its normal length, as given by the timer 9, during that portion of the day when, by a prearrangement of the switch means 20, the particular cam space under consideration, if equipped with a cam, would cause the switch means corresponding to that traffic period to be in contact or the space may be left blank, if this effect is not desired at that time.

For example, a typical arrangement of time impulses for the timer 12 as illustrated would be impulses at 6 A. M.; 8 A. M.; 12 noon; 4.30 P. M.; 7 P. M. and midnight of every day in the week and a typical prearrangement of cams in the disk may be that which would prolong the green signals of the street in the direction of the business area from 6 to 8 A. M. restore to normal control from 8 A. M. to 4.30 P. M. on Monday to Friday inclusive, prolong the green in the direction from the business to the residential section at 4.30 P. M., with the additional prolongation of the cross town or possibly a left turn movement at seven P. M. and a complete shut down at midnight. Saturday and Sunday a different set of effects could be introduced as well as on other days of the week, if required, by setting up different cam arrangements, the number of forward motions of the disk occurring per day and the hours of their occurrence remaining, however, the same for each day of the week.

While I have illustrated the switch means on timer 12 effecting the prolongation of traffic periods and shutting down the traffic system at certain times, it is obvious that any other effect which could result from the closing or opening of an electric circuit may be introduced, such as sounding a whistle or ringing a bell at certain times and in connection with certain traffic periods.

The operation resulting in the prolongation, for instance, of the green signals on the main street and the red signals on the cross street in each traffic cycle during a particular portion of the day as hereinafter described is typical of the prolongation of any other traffic period through the use of corresponding circuits and apparatus in each respective traffic period.

From feed wire 7, wire 46, switch 47, wire 48, driving coil 11, wire 49, wire 50, and switches 51, 52, 53, 54 to the return wire 8; at the same time the current passes from feed wire 7, wire 46, switch 47, wire 48, wire 65, bus bar 66 on the timer 9 through the engaged contacts of the switch means 21, wire 67, to wire 68, thence to the green signals 1 on the main street and the red signals 6 on the cross street. The current also passes from the wire 68, through wire 69, through the contacts of the switch means 28, which are held engaged by the timer 12, thence through wire 70, wire 71, through the windings of the relay 72, thence through wire 73, through a thermal switch 74 and return wire 75 to the feed wire 8, the relay 72 being energized to operate its armature switch 54, which breaks the circuit to the motor 10 for the timer 9, so that the motor stops with the contact of the switch means 21 engaged, so that the green signals are prolonged on the main street and the red signals prolonged on the cross street. The extent of the prolongation is controlled by the timing or thermal switch 74 which has heating coils 76 connected by a wire 77 having resistance R therein to the wire 70. The contacts 78, 79 of the thermal switch are normally engaged but are separated by the heating action of the coils 76, after a predetermined period. Thus the signals are prolonged the amount of time it takes the heating coil 76 to heat the thermal switch sufficient to warp it to break the contacts 78, 79.

In Figure 1, the various contacts are in their position assumed when the green and red signals on the main and cross streets are being prolonged and the thermal switch 74 has been heated sufficiently to separate the contacts 78, 79 of the thermal switch 74.

When these contacts 18, 19 are thus separated, the circuit through the relay 12 is broken, so that the switch 54 returns to its normal position and the motor circuit is again closed, so that the timer will resume its operation. As before stated, every time the contacts of the switch means 21 of the timer 9 engage, the timer will be stopped providing, of course, the second timer 12 is in its position assumed when the contacts of the switch means 28 are closed.

The motor stopping circuit for the respective traffic periods thus includes switch means 21 (or 22, 23, 24) switch means 28 (or 29, 30, 31) connected in the circuit with relays 72 (or 85, 86, 87) and their armature switch means 54 (or 53, 52, 51) and the thermal switch 74 (or 88, 89, 90).

As seen in Figures 3, 4 and 5, the body or disk of the timer 12 is mounted on a shaft 13 which is supported on brackets 90a rising from a base 91. Each of the switch means 25, 28, 29, 30 and 31, as before stated, includes pairs of contacts, like contacts being carried by a bar of insulation 92 and the other contacts by a bar of insulation 93, these bars being supported by uprights 94 rising from the base 91. The coils of the solenoid 14 are mounted upon the base and the link 16 connecting the core 15 thereof to the walking beam 17, projects upwardly from the base. The walking beam 17 is mounted between its ends on the shaft 13 to rock about the same. The end of the walking beam 17 remote from that to which the wire 15 is connected, is connected to a rod 95 which over-balances the weight of the core of the solenoid and this rod 95 is provided with a pair of separated adjustable stops 96, 97 coacting with a stop 98 fixed to the base 91 for determining the movement of the walking beam 17 and the pawl 18 and to prevent overthrow of the walking beam 17, and also to prevent a too great retrograde or resetting movement of the walking beam 17 and pawl 18. In order to hold the core 15 of the solenoid in its operated position, when the coils 14 are energized, a sticking magnet is provided for preventing the weight of the rod 95 and associated parts from overcoming, or partly overcoming, the action of the solenoid particularly when the core reaches the center of the magnetic field. 98a designates the stick magnet which is an iron screw threading through the base 21 into the path of the core 15, this being adjusted to such position that the core will stick against it when the core is actuated by the solenoid sufficiently to cause the pawl 18 to feed the ratchet wheel 19 one operation or step. Retrograde movement of the timer 12 is prevented by a pawl device 99 of any suitable construction.

What I claim is:

1. In an intersecting highway traffic signaling system, the combination with stop-go electrically operated signals presented on the highways, means for operating the signals to change through repeated traffic cycles from a go period on one highway and a stop period on the second highway to a stop period on the first highway and a go period on the second highway and back to the go period on the first highway and stop period on the second highway, and circuits in which the signals are connected, said means comprising a timer having a plurality of switches for periodically and cyclically closing and opening the signal circuits, a motor and a circuit including the motor driving coils for actuating the timer, a second timer comprising sections corresponding to different sub-divisions of time, switches corresponding to and paired with the switches of the first timer, the sections having means for selectively operating the switches of the second timer, timed means for actuating the second timer during different parts of the day, wiring connections between the switches of the two timers and normally closed switches connected in series in the driving coil circuit of the first motor, electro-magnets for opening the last mentioned switches respectively, wiring connections between the electro-magnets and the switches of the second timer respectively whereby when a circuit is closed through one of the switches of the first timer and through the switches of the second timer in circuit therewith, one of the electromagnets is energized to open one of the switches in the said driving coil circuit during one of said signal periods whereby that signal indication is maintained, and additional means in the circuits in which the electro-magnets are connected and in shunt with the electro-magnets for opening the circuit to the electro-magnets after the last safe period has been extended a predetermined time and thereby permitting the last said open switch to those whereby the driving coil circuit is again closed.

2. In an intersecting highway traffic signaling system the combination of stop-go signals which pass through repeated traffic cycles of stop-go periods, means for operating the signals to change through repeated traffic cycles, comprising a timer having switches corresponding to the periods of the traffic cycle, one switch for each period, means for actuating the timer including a motor having driving coils and a circuit in which the driving coils are connected, a second timer having switches paired respectively with the switches of the first timer and connected in circuit therewith, normally closed switches in the driving coil circuit, electromagnets, one for each of the last switches, which electromagnets, when energized, open said switches respectively, the electromagnets being paired with and connected in circuit respectively with the switches of the second timer, a normally closed switch, one for each electromagnet connected in circuit therewith which when operated renders said respective electromagnets ineffective to open the first said closed switches, and electrically operated timed means, one for each of said last mentioned normally closed switches for opening the same, said timed means being connected in circuit respectively with the switches of the second timer, and means for actuating the second timer so that the second timer opens and closes selected ones of its switches at predetermined times.

3. In a highway traffic signaling system, the combination of signals for indicating the usual traffic indications, a cycle timer operable to normally, periodically and successively operate said signals for the routine control of traffic, and means for varying the normal operation of said timer at selected intervals and for predetermined lengths of time including, a plurality of switches, and means for operating said switches on a prearranged program, electro-responsive means for actuating the timer through its cycles, a plurality of normally closed switches connected in series in circuit with the timer actuating means, and a second electro-responsive means for each of said last mentioned switches which, when energized, cause said respective switches to open, said last mentioned electro-responsive means being connected each in a circuit in series through one of said program switches and one of the switches of the cycle timer whereby, upon energization of the respective signal circuit, said second electro-responsive means is energized upon closing of said program switch to deenergize the timer actuating means, and means in each of said series circuits and operable a predetermined time after the energization of said second electro-responsive means to deenergize the same and reestablish the circuit to the timer actuating means.

4. In a work cycle control system, a work cycle timer operable through a cycle having a plurality of periods for successively energizing and de-energizing a work circuit during each period of the cycle, means for actuating the timer through its cycles, a second timer, and means for actuating it, each timer having a plurality of control elements operable for energizing and de-energizing the respective work circuits, one control element of one timer being paired with, and operable in conjunction with, one of the control elements of the other timer, means normally in inoperative condition but when in operative condition adapted to render the first timer actuating means inoperative, and means operable upon the energization of one of said work circuits through one of the pair of said control elements of both timers to render said normally inoperative second means in operative condition during selected extents of time to prolong the energization of said work circuit and means operable a predetermined time after the commencement of said prolongation for re-establishing the normal condition of the second means for the next successive period of the cycle, the last-mentioned means which is operable a predetermined time after the commencement of said prolongation, being controlled in its operation by said pair of control elements of the timers acting in conjunction.

5. In a highway traffic signaling system, the combination of signals for indicating the usual traffic indications, a cycle timer, means for controlling the operation of the timer to normally, periodically and successively operate said signals for the routine control of traffic, and means for varying the normal operation of said timer at selected intervals and for predetermined lengths of time including, a plurality of switches, and means for operating said switches on a prearranged program, a plurality of control switches, each connected in circuit with the timer controlling means, electro-responsive means for each of said last mentioned switches which, when energized, cause said respective switch to operate and modify the operation of the timer controlling means to vary the normal operation of the timer, each of said electro-responsive means being connected in a circuit in series through one of said program switches and one of the switches of the cycle timer, whereby when said timer switch is closed and the respective signal circuit energized said electro-responsive means is energized upon closing of said program switch to effect the operation of said control switch, and means associated with each of said electro-responsive means and operable a predetermined time after the energization of the electro-responsive means to de-energize the same and reestablish normal conditions in the circuit to the timer controlling means.

6. In an intersecting traffic signaling system, the combination of stop-go signals which pass through repeated traffic cycles of stop-go periods, means for operating the signals through repeated traffic cycles comprising a cycle timer having elements successively operated thereby, one for each period of the cycle, and means operated by said elements operating the signals, each of said elements being movable into and out of position to operate a respective signal circuit, means for actuating the timer through its cycle, a second timer having elements paired with and operatively connected with the elements of the first timer, means operatively connected through the movable elements of each of said timers and operable, when any pair of elements are in operated position at the same time to stop the cycle timer, timed means for starting the first timer after being stopped, there being a timed means for each period of the cycle timer and element of the second timer, and connections between each of said timed means and one of said elements of the second timer, whereby when any pair of said elements are in operated position said timed means is operated to render the cycle timer stopping means ineffective, and means for actuating the second timer so that the second timer puts its elements into operative position at selected periods for predetermined times.

HERBERT J. BRANDENBURGER.